(12) United States Patent
Zhang

(10) Patent No.: US 11,121,454 B2
(45) Date of Patent: Sep. 14, 2021

(54) ANTENNA FOR DEVICE AND FOLDABLE DEVICE

(71) Applicant: ZTE CORPORATION, Guangdong (CN)

(72) Inventor: Yan Zhang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/645,508

(22) PCT Filed: Sep. 12, 2018

(86) PCT No.: PCT/CN2018/105223
§ 371 (c)(1),
(2) Date: Mar. 9, 2020

(87) PCT Pub. No.: WO2019/052466
PCT Pub. Date: Mar. 21, 2019

(65) Prior Publication Data
US 2020/0287274 A1    Sep. 10, 2020

(30) Foreign Application Priority Data
Sep. 12, 2017 (CN) .......................... 201710817200.X

(51) Int. Cl.
*H01Q 1/24* (2006.01)
*H01Q 1/44* (2006.01)
(Continued)

(52) U.S. Cl.
CPC .............. *H01Q 1/243* (2013.01); *H01Q 1/44* (2013.01); *H01Q 1/50* (2013.01); *H04M 1/0214* (2013.01)

(58) Field of Classification Search
CPC ............ H01Q 1/243; H01Q 1/44; H01Q 1/50; H01Q 5/378; H01Q 5/328; H01Q 9/42; H01Q 1/24; H01Q 3/32; H04M 1/0214
See application file for complete search history.

(56) References Cited

U.S. PATENT DOCUMENTS 8,154,460 B2    4/2012 Sakata et al.
10,075,569 B2 *  9/2018 Kim .......................... H01Q 9/30
(Continued)

FOREIGN PATENT DOCUMENTS

CN    1918744 A    2/2007
CN    101459275 A    6/2009
(Continued)

OTHER PUBLICATIONS

China Patent Office, First Office Action dated Oct. 10, 2020 for application No. CN201710817200.X.

*Primary Examiner* — Seung H Lee

(57) ABSTRACT

The present disclosure provides an antenna for an electronic device, and a foldable device. The electronic device includes a body provided with a mainboard, and a first screen. The antenna includes: a feed point disposed at a side where the body is located; a first antenna connected to the feed point and extending from the side where the body is located to a side where the first screen is located; a second antenna disposed at the side where the body is located; a rotating shaft connected between the body and the first screen; and a switch provided between the rotating shaft and the first antenna.

14 Claims, 4 Drawing Sheets

(51) Int. Cl.
*H01Q 1/50* (2006.01)
*H04M 1/02* (2006.01)

(56) References Cited

U.S. PATENT DOCUMENTS

| | | |
|---|---|---|
| 2007/0194997 A1 | 8/2007 | Nakanishi et al. |
| 2012/0112972 A1 | 5/2012 | Ogawa |
| 2014/0240178 A1* | 8/2014 | Chun .................... G06F 1/1698 |
| | | 343/702 |
| 2018/0366813 A1* | 12/2018 | Kim .................... H04M 1/0266 |

FOREIGN PATENT DOCUMENTS

| | | |
|---|---|---|
| CN | 101630773 A | 1/2010 |
| CN | 101911386 A | 12/2010 |
| CN | 101982896 A | 3/2011 |
| CN | 102473999 A | 5/2012 |
| EP | 2221912 A1 | 8/2010 |
| KR | 20150014278 A | 2/2015 |

\* cited by examiner

ANTENNA FOR DEVICE AND FOLDABLE DEVICE

CROSS-REFERENCE TO RELATED APPLICATIONS

This is a National Phase Application filed under 35 U.S.C. 371 as a national stage of PCT/CN2018/105223, filed on Sep. 12, 2018, an application claiming the priority of Chinese Patent Application No. 201710817200.X, filed on Sep. 12, 2017, the contents of which are incorporated herein in their entirety by reference.

TECHNICAL FIELD

The present disclosure relates to, but is not limited to, the field of communications.

BACKGROUND

Terminal devices are trending to be smaller, thinner, and lighter, but have more functions, which inevitably makes higher demands on antenna design of the terminal devices. The more functions implemented, the tighter the internal space of the terminal device, and the less space left for an antenna. Thus, how to realize a same or even better performance in a smaller space is one of the difficulties in the current antenna design of the terminal device.

Advent of dual-screen devices (e.g., mobile phones) has further increased the difficulty of antenna design. Hardware design of a dual-screen mobile phone is more complicated, leaving less space for the antenna. At the same time, the screens being in an unfolded state or a folded state will greatly affect the performance of the antenna. As a result, it will be very difficult if the antenna design is still based on a traditional mobile phone.

SUMMARY

According to an embodiment of the present disclosure, there is provided an antenna for an electronic device including a body provided with a mainboard and a first screen provided separately from the body. The antenna includes: a feed point provided at a side where the body is located; a first antenna connected with the feed point and extending from the side where the body is located to a side where the first screen is located; a second antenna provided at the side where the body is located; a rotating shaft connected between the body and the first screen; and a switch provided between the rotating shaft and the first antenna.

According to another embodiment of the present disclosure, there is provided a foldable device including a body provided with a mainboard, a first screen and an antenna. The antenna includes: a feed point provided at a side where the body is located; a first antenna connected with the feed point and extending from the side where the body is located to a side where the first screen is located; a second antenna provided at the side where the body is located; a rotating shaft connected between the body and the first screen; and a switch provided between the rotating shaft and the first antenna.

BRIEF DESCRIPTION OF THE DRAWINGS

The drawings described herein which constitute a part of the present disclosure are provided for further understanding the present disclosure. The exemplary embodiments of the present disclosure and the descriptions thereof are intended to explain the present disclosure and should not be considered as a limitation of the present disclosure. In the drawings.

DETAILED DESCRIPTION

The present disclosure will be described in detail below with reference to the accompanying drawings in conjunction with embodiments. It should be noted that, in the present disclosure, the embodiments and the features of the embodiments may be combined with each other without conflict.

It is to be understood that the terms "first," "second," and the like in the description and in the claims of the present disclosure are used for distinguishing between similar elements and not necessarily for describing a particularly sequential or chronological order.

With the continuous development of science and technology, mobile phones are becoming smaller and thinner, and have more functions. At the same time, the technology of an antenna for the mobile phones in the related art is continuously developed, e.g., from exterior helical antennas to internal metal Planar Inverted-F Antennas (PIFA), then to Flexible Printed Circuit (FPC) antennas, and Laser Direct Structuring (LDS) antennas, until metal frame antennas. With respect to designing a desired antenna in a limited space, a single antenna is used for a foldable device or a flip device in the related art, which causes limited application scenarios thereof.

In the related art, as for a foldable mobile phone or a flip mobile phone, two parts of the mobile phone are connected by a rotating shaft, and the rotating shaft occupies a certain space within the mobile phone. Nowadays, the mobile phones have more and more frequency bands, and wiring area therein is getting larger and larger, which makes it difficult to balance structure and antenna design. If an antenna is designed near the rotating shaft, performance of the antenna will be interfered by the rotating shaft, resulting in unsatisfactory antenna performance. Unfolded/folded state of a dual-screen mobile phone will also affect the state of the antenna. If there is a large difference between these two states, i.e., unfolded state and folded state, it will affect debugging of the antenna and increase the difficulty for debugging the antenna.

Figure 1:
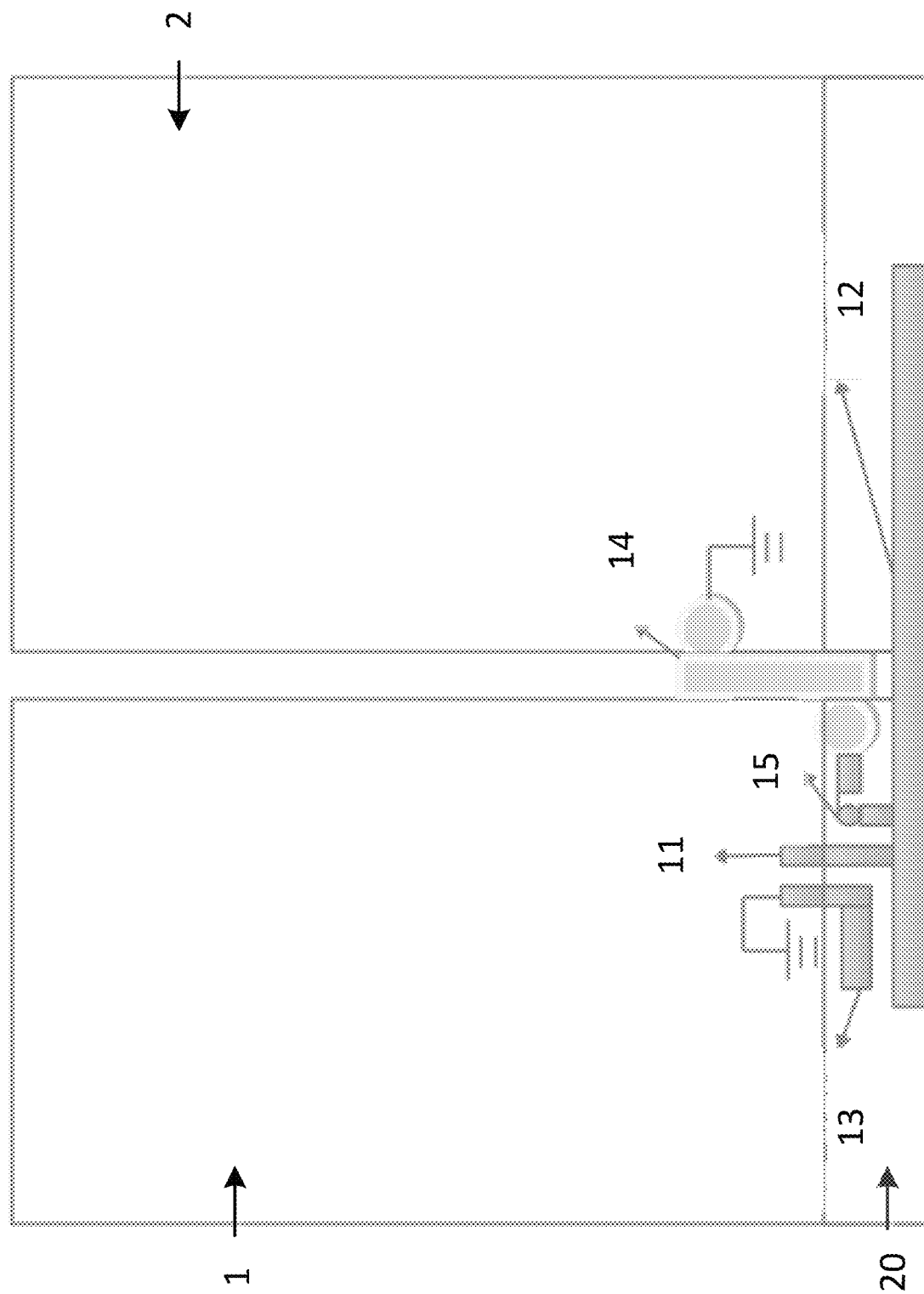
FIG. 1 is a schematic structural plan view of an antenna for an electronic device according to an embodiment of the present disclosure.

FIG. 1 is a schematic structural plan view of an antenna for an electronic device according to an embodiment of the present disclosure.

As shown in FIG. 1, the electronic device may include a body 1 provided with a mainboard and a first screen 2. The antenna may include: a feed point 11 provided at a side where the body 1 is located, by which signals may be introduced; a first antenna 12 connected with the feed point 11 and extending from the side where the body 1 is located to a side where the first screen 2 is located; a second antenna 13 disposed at the side where the body 1 is located; a rotating shaft 14 connected between the body 1 and the first screen 2; and a switch 15 provided between the rotating shaft 14 and the first antenna 12.

According to the embodiment of the present disclosure, by using the rotating shaft 14 as a part of the antenna, the space of the antenna is saved, the cost is reduced, and the influence of the rotating shaft on the antenna is reduced. In addition, an operating state of the antenna may be switched based on a relative state between the body 1 and the first screen 2 (i.e., unfolded state or folded state), so that the antenna may be switched to different operating frequency bands in different usage scenarios, thereby improving performance of the antenna and solving problems of high interference and weak performance of antenna in the related art.

According to an embodiment, the antenna 12 is disposed within a clearance area 20 between the body 1 and the first screen 2.

According to an embodiment, the body 1 may include a second screen. In a case that the body 1 includes the second screen, the electronic device is a dual-screen device, for example, a dual-screen mobile phone. The body 1 may also include a keypad, in which case the electronic device is a flip device, such as a flip mobile phone. In addition, the body 1 and the first screen 2 may be combined in other forms, for example, the electronic device may be a rotatable device.

According to an embodiment, the first antenna 12 may have a length of a quarter wavelength.

According to an embodiment, the switch 15 may be a single-pole-single-throw switch.

According to an embodiment, the switch 15 may be adjacent to the feed point 11, thereby saving more space and reducing circuit wiring during assembly.

According to an embodiment, the switch 15 may be in a turn-on state when the body 1 and the first screen 2 are in an unfolded state, and the switch 15 may be in a turn-off state when the body 1 and the first screen 2 are in a folded state.

According to an embodiment, the switch 15 may be connected to a Hall sensor disposed on the body 1 or the first screen 2. The switch 15 may be controlled according to different states of the Hall sensor, and the state of the Hall sensor may be switched by unfolding/folding of the body 1 and the first screen 2.

According to an embodiment, the first antenna 12 and the second antenna 13 are grounded on both sides of the rotating shaft 14, respectively. The first antenna 12 may be connected to ground at the side where the first screen 2 is located via the switch 15 and the rotating shaft 14, and the second antenna 13 may be directly connected to ground at the side where the body 1 is located, and is used as a parasitic antenna.

Embodiments of the present disclosure also provides a foldable device including a body 1 provided with a mainboard, a first screen 2, and an antenna as shown in FIG. 1.

According to an embodiment, the foldable device may further include a Hall sensor provided on the body 1 or the first screen 2 and connected to the switch 15.

According to an embodiment, the body 1 may include a second screen.

As shown in FIG. 1, the antenna includes the feed point 11, the first antenna 12, the second antenna 13, the rotating shaft 14, and the switch 15. The present embodiment only schematically illustrates that the body 1 and the first screen 2 are connected by the rotating shaft 14, but other connection means may also be applied to the present disclosure.

When the body 1 includes a second screen, the rotating shaft 14 may be connected between the two screens. The rotating shaft 14 is not grounded on a side where a primary screen (i.e., the second screen) is located, but is grounded on a side where a secondary screen (i.e., the first screen) is located.

The feed point 11 may be located at the side where the primary screen is located, and signals enter the antenna 12 through the feed point 11. The antenna 12 may be disposed within the clearance area 20 between the primary screen and the secondary screen and the antenna 12 may have a length of a quarter wavelength.

The first antenna 12 is connected to the rotating shaft 14 through the switch 15 at a position adjacent to the feed point 11, and then connected to ground at the side where the secondary screen is located via the rotating shaft 14. The switch 15 may be a single-pole-single-throw switch.

The second antenna 13 may be directly connected to ground at the side where the primary screen is located, and is used as a parasitic antenna.

When the primary screen and the secondary screen are in an unfolded state, the switch 15 may be turned on, and the antenna may be switched to a first state, namely, the first antenna 12 may be grounded through the rotating shaft 14, which forms a traditional IFA antenna, and based on a coupling effect between the antenna 12 and a nearby parasitic antenna (i.e., the second antenna 13), a dual-frequency antenna with a low-frequency of 850 MHz and a high-frequency of 2.4 GHz is formed. When the primary screen and the secondary screen are in a folded state, the switch 15 may be turned off, and the antenna may be switched to a second state, namely, the first antenna 12 forms a monopole antenna, and based on a coupling effect between the antenna 12 and the nearby parasitic antenna (i.e., the second antenna 13), a multi-frequency antenna with a low-frequency of 900 MHz and a medium-frequency of 1.7-2.1 GHz is formed. The switch 15 may be turned on or turned off by a hall device. Through the above operation, the switching of the antenna between different frequency bands is realized.

Figure 2:
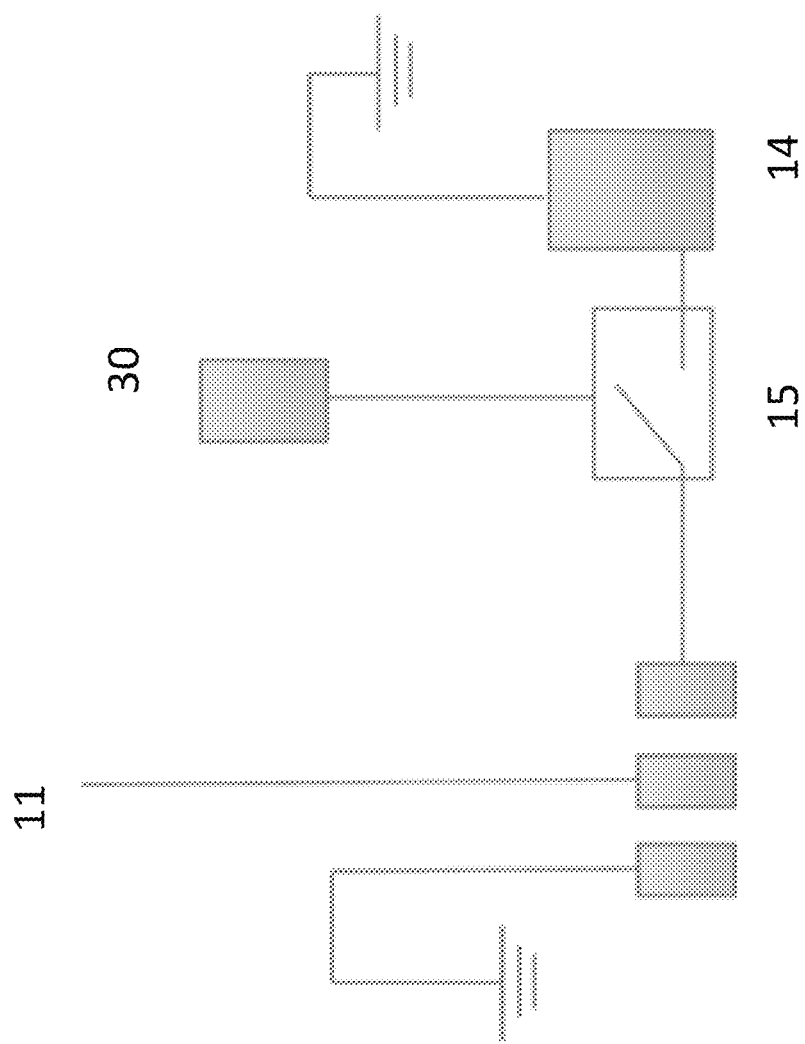
FIG. 2 is a schematic diagram of an electrical circuit at a rotating shaft of an antenna according to an embodiment of the present disclosure.

FIG. 2 is a schematic diagram of an electrical circuit at a rotating shaft of an antenna according to an embodiment of the present disclosure.

As shown in FIG. 2, the rotating shaft 14 is connected to the switch 15, the switch 15 is connected with a hall device 30, and the switch 15, which is a single-pole-single-throw switch, is connected with the feed point 11. The feed point 11 may act as a feed source of the antenna.

Passive tests are performed under these two states of the antenna in a laboratory, and the antenna is switched between the two following groups of frequency bands, i.e., B5/B40 and B1/B3/B8. In addition, the operating frequency band may be adjusted as required.

Figure 3:
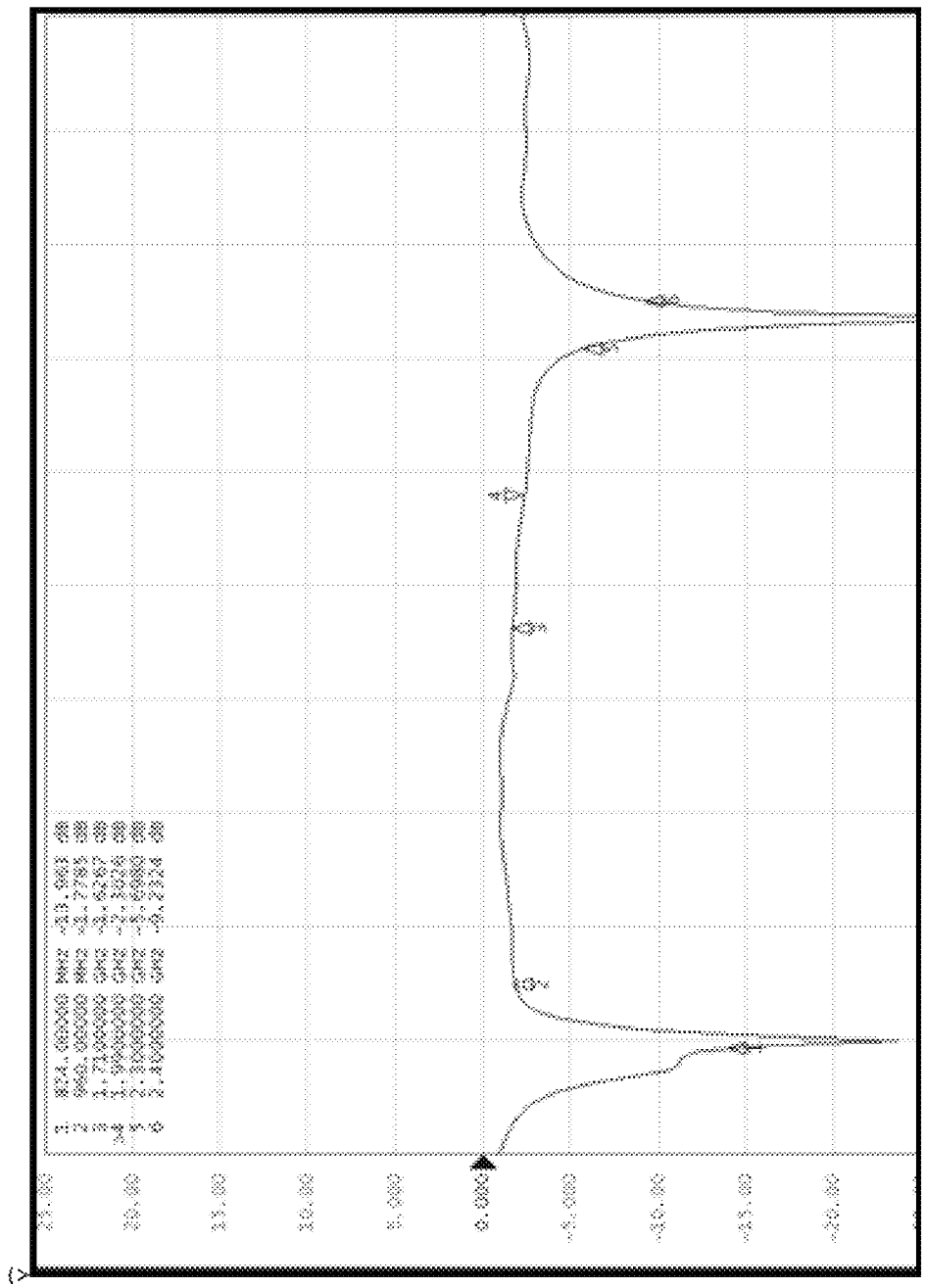
FIG. 3 is a schematic diagram of return loss of an antenna in a first state according to an embodiment of the present disclosure.
Figure 4:
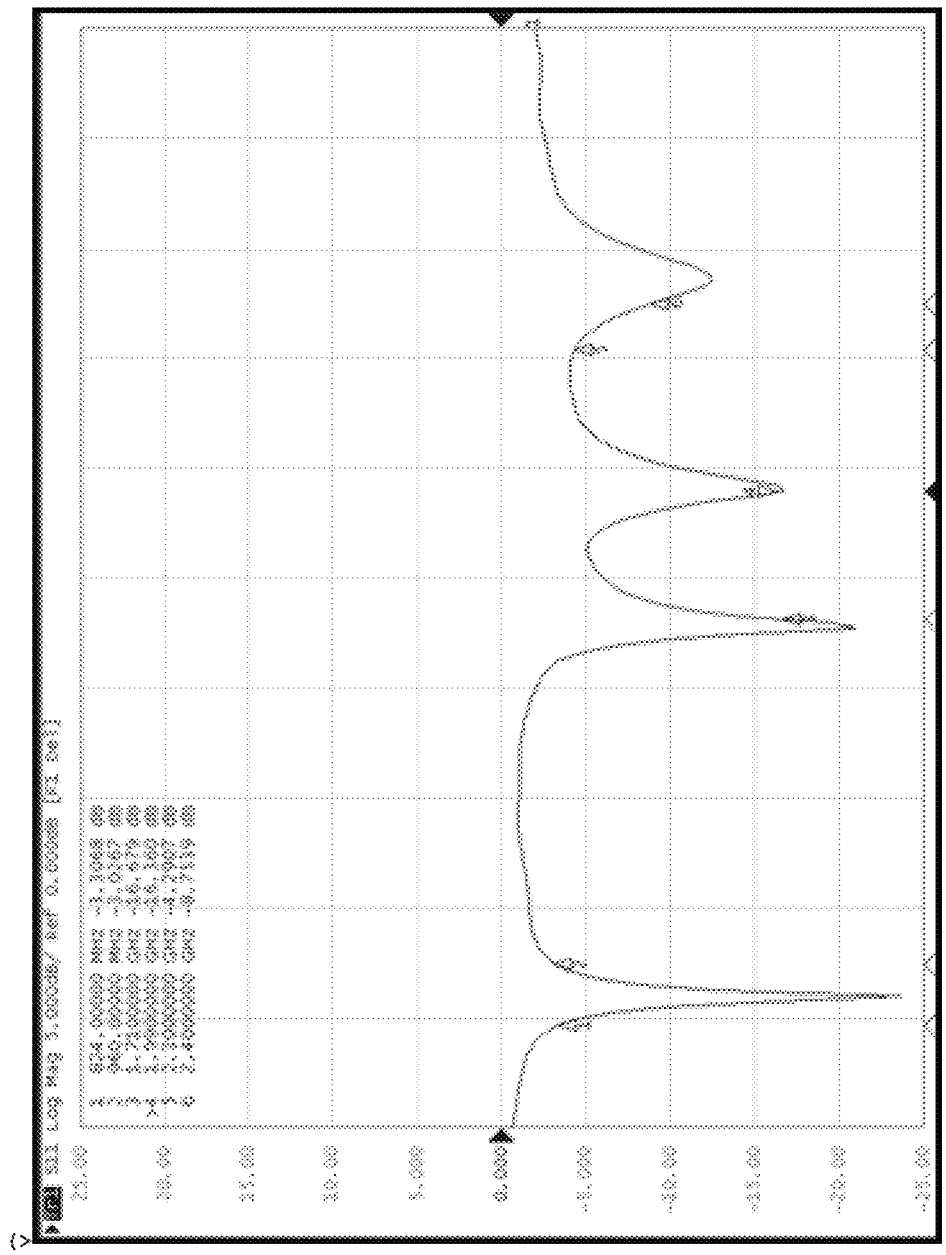
FIG. 4 is a schematic diagram of return loss of an antenna in a second state according to an embodiment of the disclosure.

FIG. 3 is a schematic diagram of return loss of the antenna in a first state according to an embodiment of the present disclosure, and FIG. 4 is a schematic diagram of return loss of the antenna in a second state according to an embodiment of the disclosure.

Referring to FIGS. 3 and 4, low-frequency efficiency in the two states exceed 30% and high-frequency in the two states exceeds 40%, which can prove that the antennas according to the embodiments of the present disclosure can operate normally.

According to the embodiments of the present disclosure, the rotating shaft is used as a part of the antenna, the state of the antenna is controlled according to the connection between the rotating shaft and the ground, which makes full use of the metal characteristic of the rotating shaft itself, and saves the wiring area of a part of the antenna in a tight structural design.

According to the embodiment of the disclosure, by using the rotating shaft as a part of the antenna, the space occupied by the antenna is saved, and meanwhile, by changing the different states of the antenna by using the rotating shaft of the antenna, it is possible to improve the performance of the antenna. By using the rotating shaft as a part of the antenna, the space of the antenna is saved, the cost is reduced, and the bad influence of the rotating shaft on the antenna is reduced. In addition, the operating state of the antenna can be switched based on the state (i.e., an unfolded state or a folded state) between the two screens, so that the mobile phone antenna can be switched to different operating frequency bands in different usage scenarios, thereby improving the performance of antenna.

The above are only examples of the present disclosure and are not intended to limit the present disclosure. It will be apparent to those skilled in the art that various modifications and variations can be made in the present disclosure. Any modification, equivalent replacement, or improvement made within the spirit and principle of the present disclosure should be included in the protection scope of the present disclosure.

What is claimed is:

1. An antenna for an electronic device comprising a body provided with a mainboard and a first screen provided separately from the body, wherein the antenna comprises:
    a feed point provided at a side where the body is located;
    a first antenna connected with the feed point and extending from the side where the body is located to a side where the first screen is located;
    a second antenna provided at the side where the body is located;
    a rotating shaft connected between the body and the first screen; and
    a switch provided between the rotating shaft and the first antenna,
    wherein the switch is a single-pole-single-throw switch.

2. The antenna of claim 1, wherein the first antenna has a length of a quarter wavelength.

3. The antenna of claim 1, wherein the switch is adjacent to the feed point.

4. The antenna of claim 1, wherein the switch is in a turn-on state when the body and the first screen are in an unfolded state, and the switch is in a turn-off state when the body and the first screen are in a folded state.

5. The antenna of claim 1, wherein the switch is connected to a Hall sensor disposed on one of the body and the first screen.

6. The antenna of claim 1, wherein the first antenna and the second antenna are grounded at both sides of the rotating shaft, respectively.

7. The antenna of claim 1, wherein the body comprises a second screen.

8. A foldable device comprising a body provided with a mainboard, a first screen and an antenna, wherein the antenna comprises:
    a feed point provided at a side where the body is located;
    a first antenna connected with the feed point and extending from the side where the body is located to a side where the first screen is located;
    a second antenna provided at the side where the body is located;
    a rotating shaft connected between the body and the first screen; and
    a switch provided between the rotating shaft and the first antenna,
    wherein the switch is a single-pole-single-throw switch.

9. The foldable device of claim 8, further comprising:
    a Hall sensor disposed on one of the body and the first screen and connected to the switch.

10. The foldable device of claim 8, wherein the body comprises a second screen.

11. The foldable device of claim 8, wherein the first antenna has a length of a quarter wavelength.

12. The foldable device of claim 8, wherein the switch is adjacent to the feed point.

13. The foldable device of claim 8, wherein the switch is in a turn-on state when the body and the first screen are in an unfolded state, and the switch is in a turn-off state when the body and the first screen are in a folded state.

14. The foldable device of claim 8, wherein the first antenna and the second antenna are grounded at both sides of the rotating shaft, respectively.

* * * * *